US011343656B2

(12) United States Patent
Hyun et al.

(10) Patent No.: US 11,343,656 B2
(45) Date of Patent: May 24, 2022

(54) METHOD OF OPERATING TERMINAL MISSION CRITICAL PUSH TO TALK GROUP PARTICIPATING IN MISSION CRITICAL PUSH TO TALK GROUP CALL IN OFF NETWORK

(71) Applicant: SAMSUNG ELECTRONICS CO., LTD., Suwon-si (KR)

(72) Inventors: Bo-ra Hyun, Hwaseong-si (KR); Jun-hyuk Ko, Suwon-si (KR); Min-suk Ko, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/983,506

(22) Filed: Aug. 3, 2020

(65) Prior Publication Data

US 2020/0367023 A1    Nov. 19, 2020

Related U.S. Application Data

(63) Continuation of application No. 15/795,487, filed on Oct. 27, 2017, now Pat. No. 10,735,915.

(30) Foreign Application Priority Data

Nov. 4, 2016   (KR) .................. 10-2016-0146916
May 2, 2017   (KR) .................. 10-2017-0056263

(51) Int. Cl.
  *H04W 4/10*    (2009.01)
(52) U.S. Cl.
  CPC ..................... *H04W 4/10* (2013.01)

(58) Field of Classification Search
  CPC .......... H04W 4/08; H04W 4/10; H04W 84/18
  See application file for complete search history.

(56) References Cited

U.S. PATENT DOCUMENTS 7,814,205 B2  10/2010  LoGalbo et al.
7,889,726 B2   2/2011  Poikelkä et al.
(Continued)

FOREIGN PATENT DOCUMENTS

KR   10-2008-0073889 A   8/2008
KR    1020090019098 A   2/2009
(Continued)

OTHER PUBLICATIONS

LTE: Mission Critical Push To Talk (MCPTT) media plane control; ETSI TS 124 380 (Year: 2016).*
(Continued)

*Primary Examiner* — Raymond S Dean
(74) *Attorney, Agent, or Firm* — Sughrue Mion, PLLC

(57) ABSTRACT

A method of operating a first terminal participating in a Mission Critical Push To Talk (MCPTT) group call in an off-network includes: receiving a first floor grant message configured to indicate a floor transfer from a second terminal to a third terminal; storing a Synchronization Source (SSRC) of the third terminal included in the first floor grant message as an SSRC of a next floor arbitrator; receiving a media packet or a floor control message; and, if a transmitter of the media packet or the floor control message is the next floor arbitrator, updating an SSRC of a current floor arbitrator as the SSRC of the next floor arbitrator.

19 Claims, 13 Drawing Sheets

(56) References Cited

U.S. PATENT DOCUMENTS

| | | | |
|---|---|---|---|
| 7,958,254 | B2 | 6/2011 | Hundscheidt et al. |
| 8,184,795 | B2 | 5/2012 | Keller et al. |
| 8,654,686 | B2 | 2/2014 | Anchan |
| 9,456,039 | B2 | 9/2016 | Sharma et al. |
| 9,510,166 | B1 * | 11/2016 | Allen ................ H04W 4/08 |
| 2003/0235184 | A1 | 12/2003 | Dorenbosch et al. |
| 2006/0084455 | A1 | 4/2006 | Schwagmann et al. |
| 2009/0054097 | A1 | 2/2009 | Kim et al. |
| 2016/0212683 | A1 * | 7/2016 | Freeman ........... H04B 7/15507 |
| 2016/0295496 | A1 | 10/2016 | Us et al. |
| 2016/0344726 | A1 * | 11/2016 | Stojanovski ...... H04W 12/0431 |
| 2016/0360474 | A1 * | 12/2016 | Arzelier ............... H04W 48/16 |
| 2016/0381141 | A1 | 12/2016 | Baek et al. |
| 2017/0048894 | A1 * | 2/2017 | Choi ...................... H04W 4/10 |
| 2017/0289776 | A1 | 10/2017 | Kim et al. |
| 2018/0242120 | A1 * | 8/2018 | Baek .................... H04W 12/08 |

FOREIGN PATENT DOCUMENTS

| | | |
|---|---|---|
| KR | 10-2017-0001537 A | 1/2017 |
| WO | 2016/111528 A1 | 7/2016 |

OTHER PUBLICATIONS

Communication dated Jul. 20, 2021 issued by the Korean Patent Office in application No. 10-2017-0056263.

"3rd Generation Partnership Project; Technical Specification Group Services and System Aspects Functional architecture and information flows to support mission critical communication services; Stage 2 (Release 13)", 3GPP TS 23.179, V13.0.0, Dec. 2015, pp. 1-228.

"3rd Generation Partnership Project; Technical Specification Group Core Network and Terminals Mission Critical Push to Talk (MCPTT) media plane control; Protocol specification (Release 13)", 3GPP TS 24.380, V13.0.2, Mar. 2016, pp. 1-207.

* cited by examiner

METHOD OF OPERATING TERMINAL MISSION CRITICAL PUSH TO TALK GROUP PARTICIPATING IN MISSION CRITICAL PUSH TO TALK GROUP CALL IN OFF NETWORK

CROSS-REFERENCE TO THE RELATED APPLICATIONS

This application is a Continuation Application of U.S. application Ser. No. 15/795,487, filed on Oct. 27, 2017, which claims priority from Korean Patent Applications No. 10-2016-0146916, filed on Nov. 4, 2016 and No. 10-2017-0056263, filed on May 2, 2017, in the Korean Intellectual Property Office, the disclosures of which are incorporated herein in their entireties by reference.

BACKGROUND

The inventive concept relates to a Mission Critical Push to Talk (MCPTT) service, and more particularly, to a method of controlling a floor of an MCPTT group performing the MCPTT service in an off-network.

Recently, special purpose-communication systems for public safety, transportation, and public utilities and industries are being studied. These special purpose-communication systems have to provide group communication services such as Push-to-Talk (PTT) and support services in disaster situations where a communication infrastructure is not supported. An MCPTT service based on 3rd Generation Partnership Project (3GPP) guarantees a PTT service through direct communication between terminals when a base station and a server cannot function, i.e., in an off-network situation, and describes protocols related to floor control so that the floor control can be performed without an arbitration server.

SUMMARY

The inventive concept provides a method of controlling a floor capable of reducing time spent in transferring the floor in a Mission Critical Push To Talk (MCPTT) group call in an off-network, and allowing the floor to be transferred properly even if a next floor arbitrator does not answer.

According to an aspect of an example embodiment, there is provided a method of operating a first terminal configured participating in an MCPTT group call in an off-network including: receiving a first floor grant message configured to indicate a floor transfer from a second terminal to a third terminal; storing a Synchronization Source (SSRC) of the third terminal included in the first floor grant message as an SSRC of a next floor arbitrator; receiving a media packet or a floor control message; and, if a transmitter of the media packet or the floor control message is the next floor arbitrator, updating an SSRC of a current floor arbitrator as the SSRC of the next floor arbitrator.

According to an aspect of an example embodiment, there is provided a method of operating an MCPTT group including a plurality of terminals participating in an MCPTT group call in an off-network including: receiving, by a first terminal, a first floor grant message indicating a floor transfer from a second terminal that controls a floor to the first terminal; transmitting a floor taken message to the second terminal and the plurality of terminals, except the first terminal, by the first terminal; and controlling the floor by the first terminal.

According to an aspect of an example embodiment, there is provided a method of operating an MCPTT group including a plurality of terminals participating in an MCPTT group call in an off-network including: transmitting, by a first terminal which is a current floor arbitrator among the plurality of terminals, a floor grant message, including information about a second terminal to which a floor is to be transferred from the first terminal, to other terminals including the second terminal in the plurality of terminals; and storing, by the first terminal, the second terminal as the current floor arbitrator prior to the second terminal takes or rejects the floor, wherein when the first terminal stores the second terminal as the current floor arbitrator, the other terminals except the second terminal still store the first terminal as the current floor arbitrator.

BRIEF DESCRIPTION OF THE DRAWINGS

Example embodiments of the inventive concept will be more clearly understood from the following detailed description taken in conjunction with the accompanying drawings, in which.

DETAILED DESCRIPTION OF THE EXAMPLE EMBODIMENTS

Hereinafter, example embodiments of the inventive concept will be described in detail with reference to the accompanying drawings.

Figure 1:
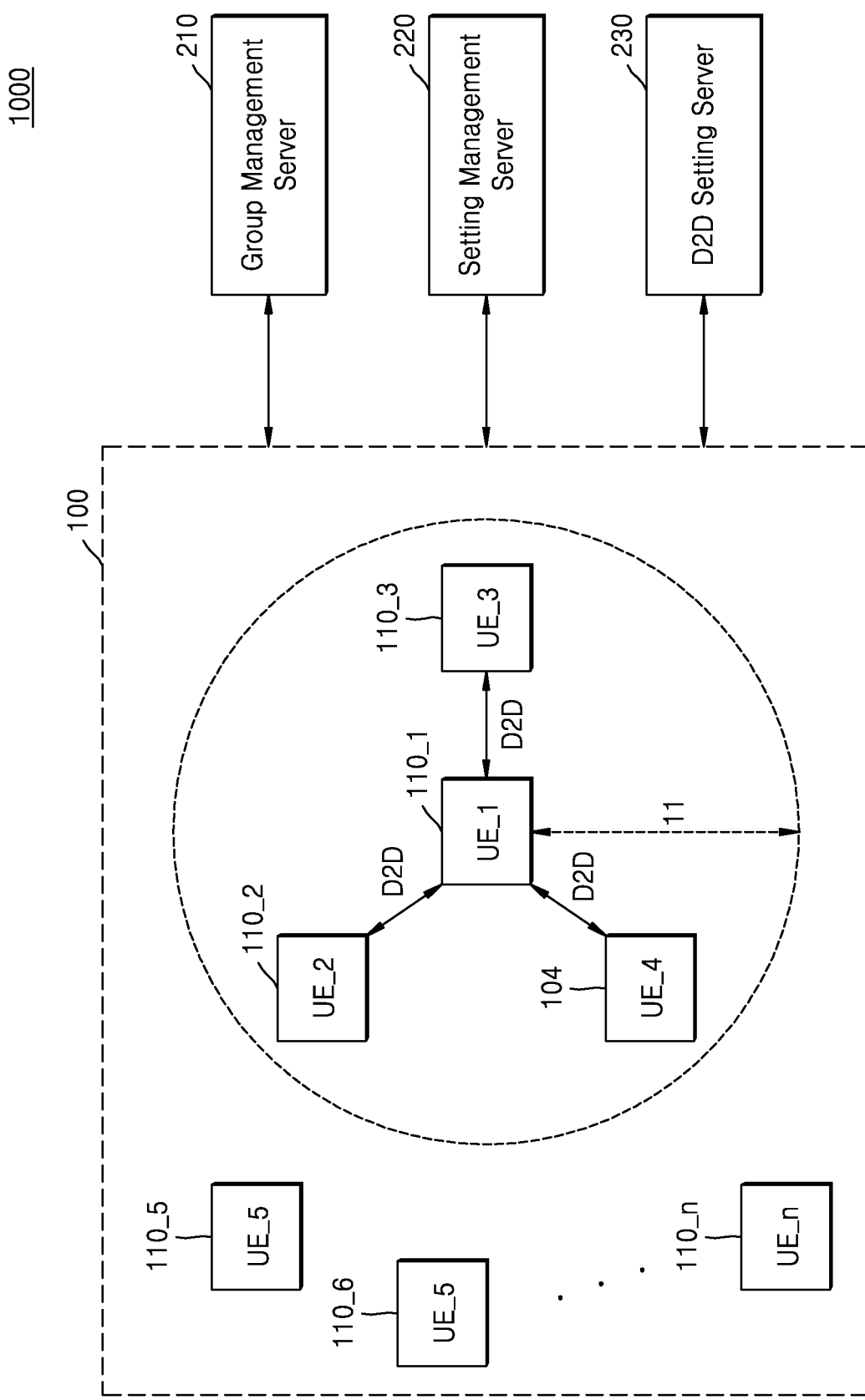
FIG. 1 is a block diagram of a Mission Critical Push To Talk (MCPTT) service system according to an example embodiment of the inventive concept.

FIG. 1 is a block diagram of a Mission Critical Push To Talk (MCPTT) service system 1000 according to an example embodiment of the inventive concept.

Referring to FIG. 1, the MCPTT service system 1000 may include a group management server 210, a setting management server 220, a Device to Device (D2D) setting server 230, and an MCPTT group 100. The MCPTT group 100 may include a plurality of terminals 110_1 to 110_*n*.

Although FIG. 1 shows one MCPTT group 100, the inventive concept is not limited thereto. The MCPTT service system 1000 may include a plurality of MCPTT groups. Each of the plurality of terminals 110_1 to 110_*n* may be included in one or more MCPTT groups. Further, although FIG. 1 shows the group management server 210, the setting management server 220, and the D2D setting server 230 are separate severs, they may be implemented in a one server, e.g., one of the servers 210, 220 and 230.

The MCPTT system 1000 may support an MCPTT service in an off-network to a plurality of users who cannot use a base network in a situation where a communication network infrastructure such as a base station is not working or a communication infrastructure does not exist. The plurality of users may be referred to as a person who uses a terminal or a device (e.g., an artificial intelligence electronic device) using a terminal.

The plurality of terminals 110_1 to 110_*n* may be referred to as user equipment. Each of the plurality of terminals 110_1 to 110_*n* may include an MCPTT module described later below with reference to FIG. 2.

The plurality of terminals 110_1 to 110_*n* may receive MCPTT off-network-related configuration information from the group management server 210 and the setting management server 220 through a base communication network so as to perform the MCPTT service in an off-network. The plurality of terminals 110_1 to 110_*n* may receive the MCPTT off-network-related configuration information in an on-network. The base communication network may include, but is not limited to, Long Term Evolution (LTE™), an LTE-Advanced (LTEA) mobile communication network, Wireless Fidelity (Wi-Fi), Bluetooth, or the like. The MCPTT off-network-related configuration information may include group configuration information and information required for Device to Device (D2D) communication and an off-network group call connection.

The group configuration information may include group management information, user profile information, and service control information. The group management information may include a group ID of the MCPTT group 100, floor priority between the plurality of terminals 110_1 to 110_*n*, a broadcast (multicast) address, and an ID used in the D2D communication.

The ID used in the D2D communication may refer to a ProSe Layer-2 Group ID. A group member may refer to each of the terminals 110_1 to 110_*n* included in the MCPTT group 100 or a user of each of the terminals 110_1 to 110_*n*. The user profile information may include an MCPTT ID allocated to each of the terminals 110_1 to 110_*n* and group list information for allowing the MCPTT service in an off-network. The MCPTT ID may correspond to user information of each of the terminals. The service control information may include request-related time limit information for a call and a floor, considering an MCPTT distribution control environment in an off-network.

Also, the plurality of terminals 110_1 to 110_*n* may receive configuration information and permission information, such as frequency information, geographical information, and the like, which can be used for D2D communication, from the D2D setting server 230.

In an example embodiment, a unique ProSe Layer-2 group ID may be allocated to the MCPTT group 100 that allows the MCPTT service in an off-network, and a unique MCPTT ID may be allocated to each of the plurality of terminals 110_1 To 110_*n* included in the MCPTT group 100. The MCPTT ID allocated to each of the plurality of terminals 110_1 to 110_*n* may be referred to as a terminal ID of an MCPTT group call in an off-network.

In another example embodiment, the MCPTT off-network-related configuration information and the permission information for D2D communication described above may be pre-stored in each of the plurality of terminals 110_1 to 110_*n* before the terminals are distributed. The plurality of terminals 110_1 to 110_*n* may perform the MCPTT group call in an off-network without accessing the group management server 210, the setting management server 220, and the D2D setting server 230 via a base network.

There is no server for controlling communication at the center in an off-network, and each terminal may communicate with other terminals within a range where direct communication, for example, D2D communication, is possible. The plurality of terminals 110_1 to 110_*n* belonging to the same MCPTT group 100 may communicate with the MCPTT group call (hereinafter, referred to as a group call) with the same group terminals within a range where direct communication is possible. For example, the first terminal UE_1 belongs to the same MCPTT group 100 and is capable of group communication with the second to fourth terminals UE 2 to UE 4 within a D2D communication radius 11 of the first terminal UE_1. However, since the plurality of terminals 110_1 to 110_*n* are mobile in an off-network environment, terminals within the D2D communication radius 11 of the first terminal UE_1 may be changed, and thus, terminals participating in the group call may be changed.

In the following description, it is assumed that the plurality of terminals 110_1 to 110_*n* participate in a group call. A terminal controlling a floor among the plurality of terminals 110_1 to 110_*n* may be referred to as a floor arbitrator, and other terminals may be referred to as group call participants. Transmission and reception of a floor control message or media (or referred to as a media packet) among the plurality of terminals 110_1 to 110_*n* is performed through broadcasting, and terminals participating in a group call may receive all packets transmitted by other terminals. However, since only terminals in a range where direct communication can be performed may communicate with one another, and thus transmission and reception of desired packets cannot be guaranteed. The floor control message may include a floor grant message, a floor taken message, a message rejecting a floor or a floor grant, etc., which are described later.

The plurality of terminals 110_1 to 110_*n* perform the MCPTT service in an off-network by transmitting and receiving the floor control message and a Real time Transport Protocol (RTP) media packet.

The transmission and reception of the floor control message and the RTP media packet transmitted and received by the plurality of terminals 110_1 to 110_*n* in an off-network may be performed by using the ProSe Layer-2 group ID and the broadcast address allocated to the MCPTT group 100.

As described above, a group call may be performed among the plurality of terminals 110_1 to 110_*n* through D2D communication without a separate control server. A participant participating in the group call, for example, a terminal having the floor among the first to nth terminals UE_1 to UE_n, may control the floor. Therefore, a floor arbitrator may be used with the same meaning as a floor occupant.

The floor arbitrator whose speech has been completed may select one of terminals requesting the floor, and may return as a group call participant after transferring the floor to the selected terminal.

In an example embodiment, terminals participating in a group call may manage current floor arbitrator information and next floor arbitrator information. A current floor arbitrator (or current arbitrator) means a floor arbitrator, and a next floor arbitrator (or next arbitrator) means a floor arbitrator candidate which is expected to control the floor following the current floor arbitrator.

When terminals other than the floor arbitrator determine that the floor is substantially transferred to a terminal corresponding to the next floor arbitrator information based on the current floor arbitrator information and the next floor arbitrator information, it is possible to implement a delayed update of the floor arbitrator information by an operation such as storing the next floor arbitrator information as the current floor arbitrator information. When the terminals receive a floor grant message from the floor arbitrator, the floor arbitrator information is updated with a delay rather than immediately, so that the floor may be stably transferred.

In another example embodiment, when a terminal to which the floor is to be transferred receives a floor grant message for the terminal itself, the terminal to which the floor is to be transferred may transmit a floor taken message to other terminals regardless of whether or not a user of the terminal answers. Accordingly, the floor transfer is completed, and the terminal to which the floor has been transferred may operate as a floor arbitrator. After transmitting the floor taken message, the terminal to which the floor has been transferred may operate as a floor arbitrator regardless of whether or not the user answers. The floor arbitrator who has transmitted the floor grant message may return as a group call participant upon receiving the floor taken message from the terminal to which the floor is to be transferred.

A base station may not assure group communication and transmission/reception of a floor control message in an off-network. Direct communication between terminals may be performed. Therefore, ineffective operation may occur during transferring the floor or the floor may not be normally transferred.

However, when the MCPTT system 1000 according to the present example embodiment performs delayed update of floor arbitrator information or transmits a floor taken message to other terminals, a floor transfer is completed, so that the floor transfer may be efficiently performed. Accordingly, an ineffective operation in the floor transfer process of the MCPTT system 1000 is prevented, and the floor transfer may be stably performed.

Hereinafter, methods of transferring the floor of the MCPTT call group in an off-network according to the example embodiments of the inventive concept described above will be described in more detail.

Figure 2:
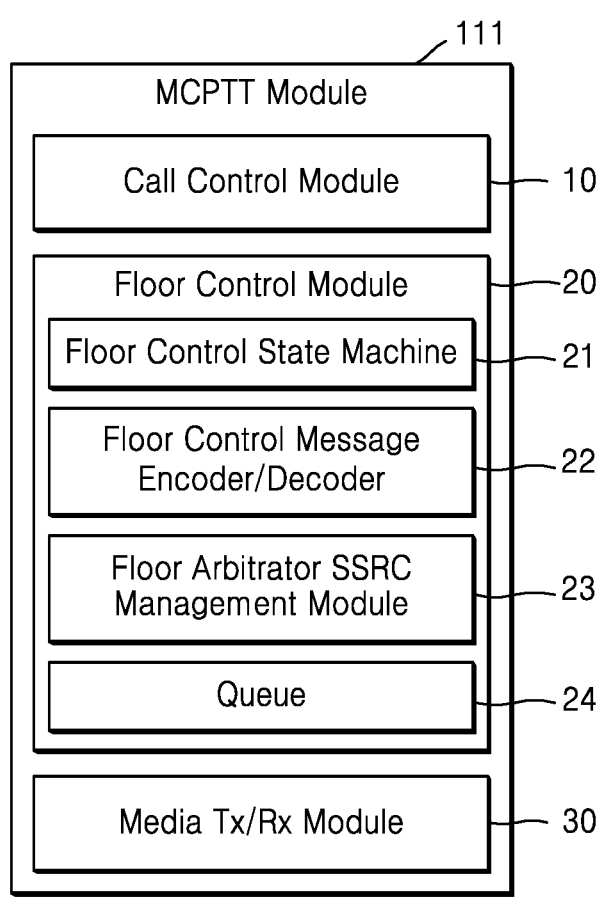
FIG. 2 is a block diagram of an MCPTT module according to an example embodiment.

FIG. 2 is a block diagram of an MCPTT module 111 according to an example embodiment.

The MCPTT module 111 may be included in each of the plurality of terminals 110_1 to 110_n in FIG. 1. Each of the plurality of terminals 110_1 to 110_n may further include a Push-to-Talk (PTT) button for providing services smoothly, a screen for displaying information such as a display module or a touch screen module, and a peripheral device such as a speaker and a microphone for media packet input/output.

Referring to FIG. 2, the MCPTT module 111 may include a call control module 10, a floor control module 20, and a media packet transmission/reception module 30.

The call control module 10 may perform MCPTT group call connection and manage the entire call. The call control module 10 may manage a group call to be set up or participation of other terminals in a group call that has been set up. For example, the call control module 10 may transmit MCPTT group call announcement requesting the start of a group call to the same MCPTT group members within a range where direct communication, for example, D2D communication, with a terminal transmitting the MCPTT group call announcement is possible. In addition, the call control module 10 may check an MCPTT group call announcement received from other terminals, and may extract call-related information from the received MCPTT group call announcement if the MCPTT group call announcement is for a group call that is permitted to participate by the terminal.

The floor control module 20 may control a floor to perform the MCPTT group call in an off-network smoothly. The floor control module 20 may include a floor control state machine 21, a floor control message encoder/decoder 22, a floor arbitrator Synchronization Source (SSRC) management module 23, and a queue 24.

The floor control state machine 21 may manage a floor state of the terminal. The floor control state machine 21 may generate a state corresponding to the terminal among a plurality of states defined in relation to the floor of the MCPTT group call in an off-network. For example, the plurality of states may include a 'start-stop' state, an 'O: silence' state, an 'O: has no permission' state, an 'O: has permission', an 'O: pending request' state, an 'O: pending granted' state, and an 'O: queued' state. The floor control state machine 21 may determine, based on a current state of the terminal, a next state of the terminal according to a transmitted or received floor control message or media packet, or elapsed time of the current state.

The floor control message encoder/decoder 22 may decode a received floor control message and encode a floor control message to be transmitted. The floor control message encoder/decoder 22 may also have a function for transmitting the floor control message to the other terminals and receiving another floor control message from another terminal. A separate module for the foregoing transmission and reception of the floor control message may be provided in the floor control module 20.

The floor arbitrator SSRC management module 23 may manage an SSRC of a current floor arbitrator and an SSRC of a next floor arbitrator. The floor arbitrator SSRC management module 23 may store or update an SSRC of a candidate for a floor arbitrator as the SSRC of the next floor arbitrator and store or update an SSRC of another terminal, which the terminal recognizes as a floor arbitrator, as the current floor arbitrator. Also, the floor arbitrator SSRC management module 23 may erase the SSRC of the next floor arbitrator when the SSRC of the current floor arbitrator is updated, based on the SSRC of the next floor arbitrator, to avoid possible confusion, overload, etc.

The MCPTT module 111 may determine that a media packet or a floor control message is valid when an SSRC of a transmitter of the received media packet or floor control message is equal to the SSRC of the current floor arbitrator. The MCPTT module 111 may determine that the received media packet or floor control message is invalid and ignore the received media packet or floor control message when the SSRC of the transmitter of the received media packet or floor control message is different from the SSRC of the current floor arbitrator or the SSRC of the next floor arbitrator.

The queue 24 may manage a floor request received while the terminal is acting as a floor arbitrator. Information regarding terminals requesting the floor, such as an ID, an SSRC, and priority of the terminals, may be stored in the queue 24. The information stored in the queue 24 may be included in a floor grant message and transmitted to the other terminals.

The media packet transmission/reception module 30 may receive a media packet from the outside such as the other terminals, and convert media such as voice of a user and sound into a packet form to transmit the converted media packet to the other terminals. The media packet may include a Real-time Transport Protocol (RTP) media packet. The medial packet transmission/reception module 30 may also have a function for transmitting and receiving the floor control message, instead of the floor control message encoder/decoder 22 or the separate module in the floor control module 20.

Figure 3:
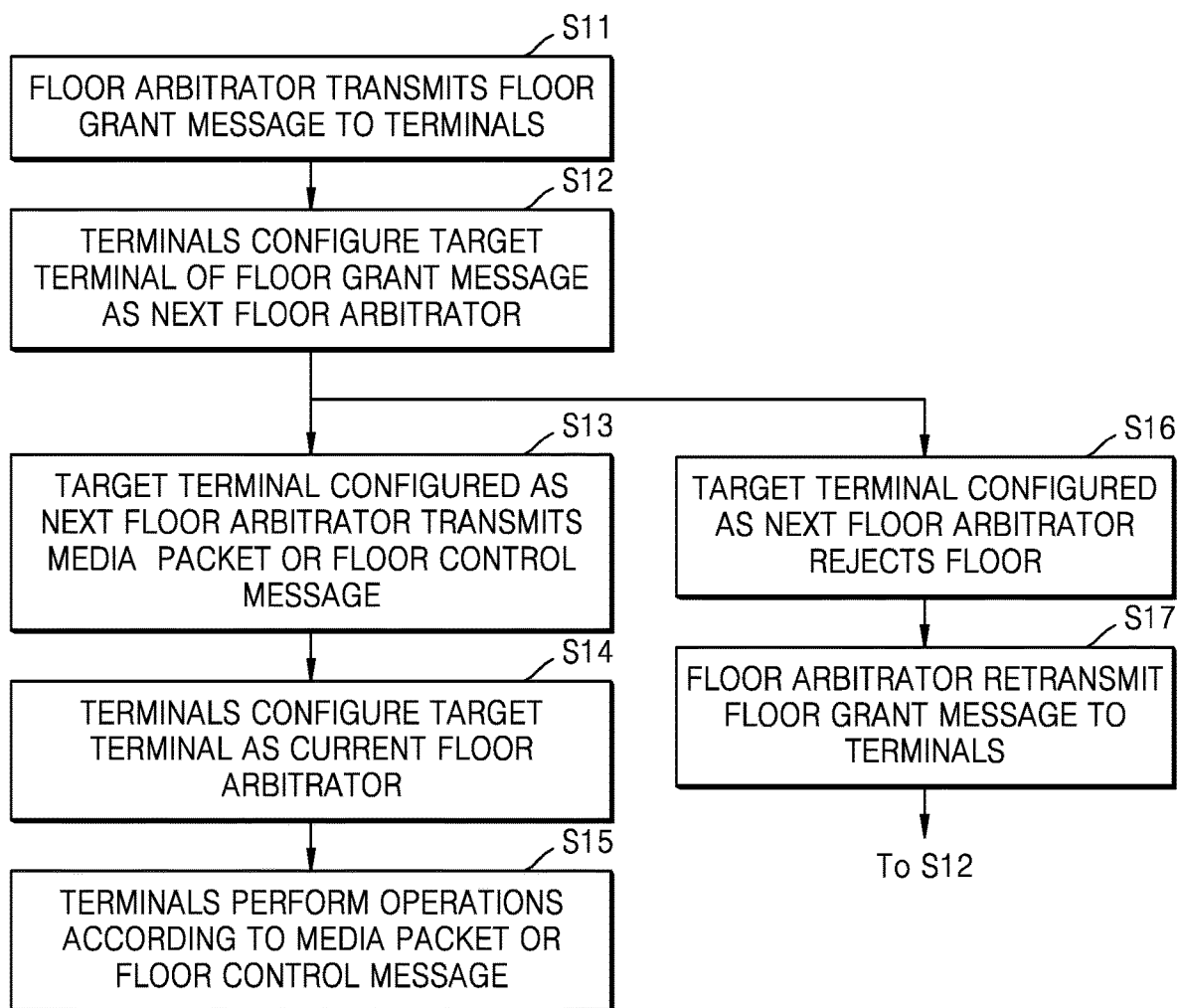
FIG. 3 is a flowchart of a method of operating terminals participating in an MCPTT group call in an off-network, according to an example embodiment of the inventive concept.

FIG. 3 is a flowchart of a method of operating terminals participating in an MCPTT group call in an off-network, according to an example embodiment of the inventive concept.

Referring to FIG. 3, in operation S11, a floor arbitrator transmits a floor grant message to the other terminals participating in a group call. The floor arbitrator may broadcast (or multicast) the floor grant message. Accordingly, the floor grant message may be transmitted to the terminals including a terminal to which a floor is transferred (hereinafter referred to as a target terminal). Here, the terminals are group call participants. The floor arbitrator may select one of the terminals requesting a floor as the target terminal, and transmit the floor grant message to the other terminals including the target terminal. The floor arbitrator may store information regarding the terminals requesting the floor, such as IDs, SSRCs and priorities, in a floor control queue (e.g., the queue 24 in FIG. 2) of the floor arbitrator. The floor arbitrator may select the target terminal by taking into account priority and the like.

The floor grant message may include an SSRC of a transmitter, an SSRC of the target terminal, an ID of the target terminal, and queue information (e.g. SSRCs and IDs of terminals requesting the floor, except the target terminal). In addition, the floor grant message may further include other information.

In operation S12, the terminals may configure the target terminal as a next floor arbitrator. In other words, the terminals may regard the target terminal as a next floor arbitrator. The terminals may manage information regarding a current floor arbitrator and information regarding the next floor arbitrator in managing information regarding the floor arbitrator. The terminals may regard the target terminal as the next floor arbitrator by storing information regarding the target terminal as information regarding the next floor arbitrator. For example, the terminals may store the SSRC of the target terminal as an SSRC of the next floor arbitrator.

In operation S13, the target terminal configured as the next floor arbitrator may transmit a media packet or a floor control message to the terminals and the current floor arbiter. When a user of the target terminal accepts taking the floor, the target terminal may transmit the media packet or the floor control message. In other words, the target terminal may broadcast the media packet or the floor control message.

In operation S14, when the media packet or the floor control message has been received from the target terminal configured as the next floor arbitrator, the terminals may configure the target terminal as the current floor arbitrator. In other words, the terminals may configure the target terminal as a new floor arbitrator. The terminals may update an SSRC of the current floor arbitrator by storing the SSRC of the next floor arbitrator, i.e., the SSRC of the target terminal, as the SSRC of the current floor arbitrator. Thus, a floor transfer to the target terminal may be completed.

In operation S15, the terminals and the previous floor arbitrator may perform operations according to the media packet or the floor control message. The terminals and the previous floor arbitrator may run the media packet. Alternatively, each state of the terminals and the previous floor arbitrator may be maintained or changed to different states depending on the type of the received floor control message.

On the other hand, in operation S16 after operation S12, the target terminal configured as the next floor arbitrator may reject the floor. In other words, the target terminal may not accept the floor grant message. For example, if a user does not accept taking the floor or does not respond to the target terminal within a predetermined time, the target terminal may reject the floor. In an example embodiment, the target terminal may not respond to the floor grant message.

In operation S17, if the target terminal rejects the floor in operation S16, the floor arbitrator may transmit another floor grant message to the terminals. The current floor arbitrator may reselect a terminal having priority as a new target terminal based on the queue information and broadcast the other floor grant message granting the floor to the new target terminal, to the terminals. Hereinafter, operations after operations S12 may be performed.

Figure 4A:
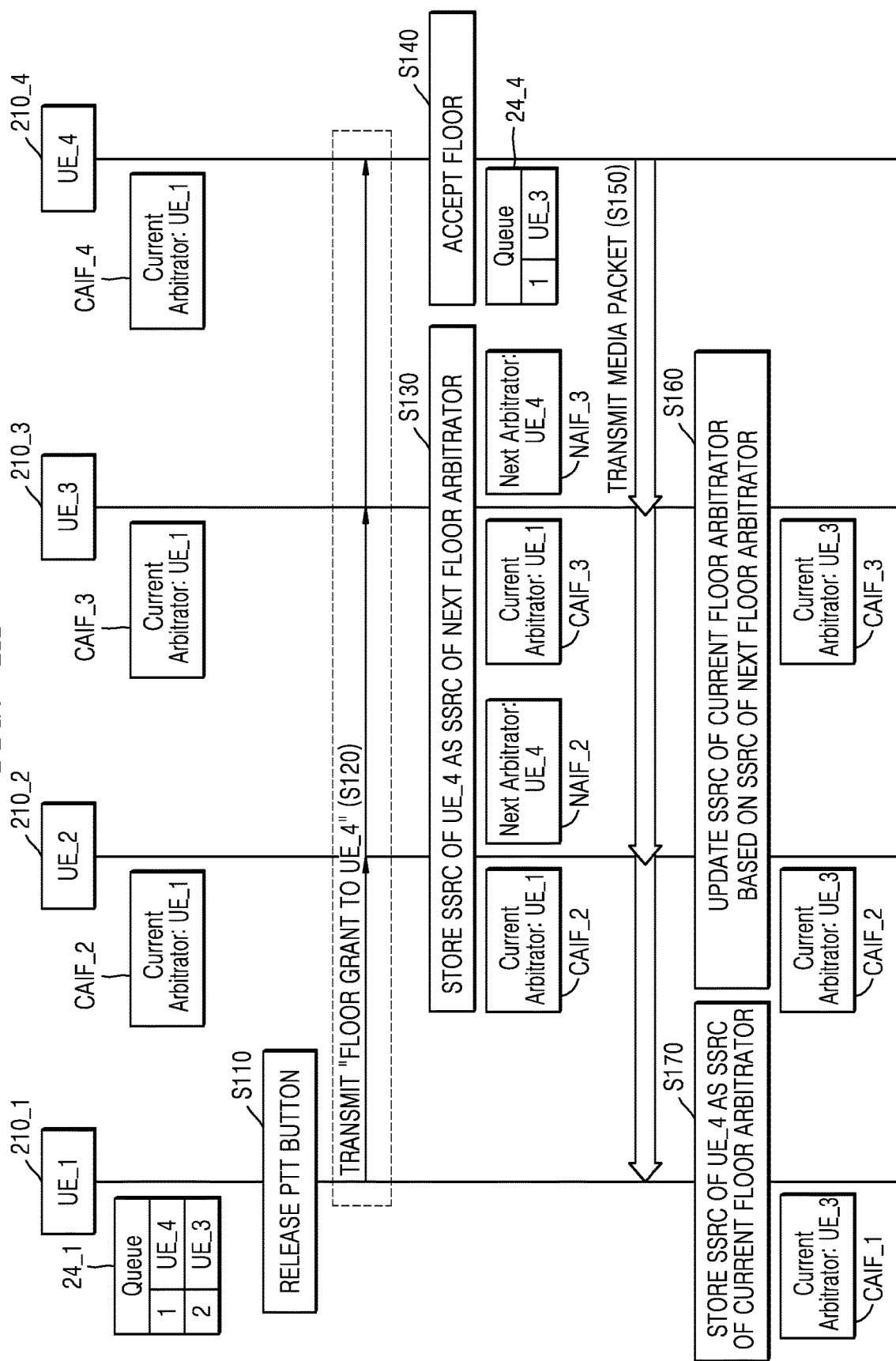
FIGS. 4A and 4B are flowcharts of a method of operating terminals participating in an MCPTT group call in an off-network, according to example embodiments of the inventive concept.
Figure 4B:
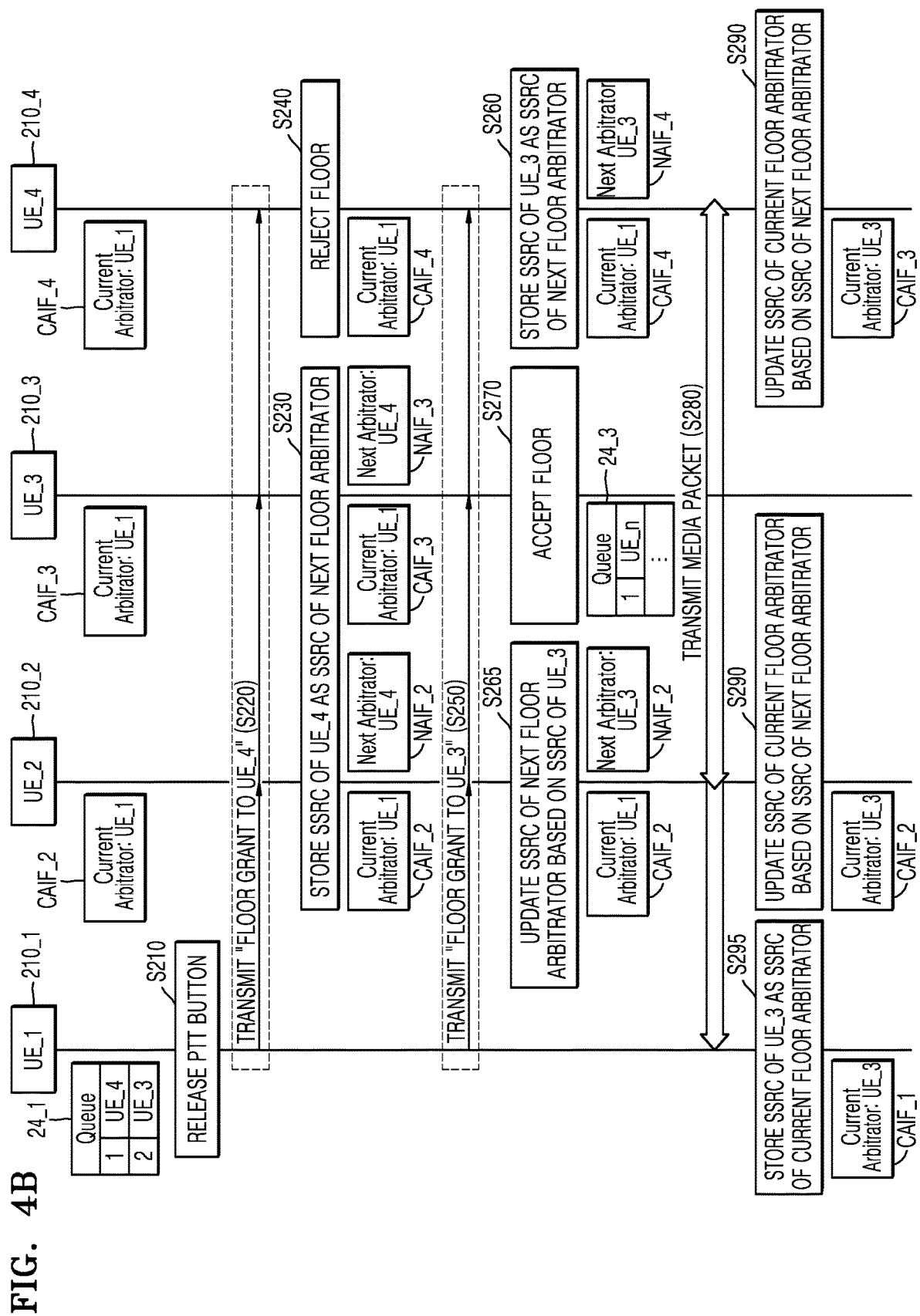

FIGS. 4A and 4B are flowcharts of a method of operating terminals participating in an MCPTT group call in an off-network, according to an example embodiment of the inventive concept. In more detail, FIGS. 4A and 4B show processes of transferring a floor. For convenience of explanation, current floor arbitrator information CAIF_1, CAIF_2, CAIF_3, and CAIF_4 and next floor arbitrator information NAIF_2, NAIF_3, and NAIF_4 stored in each of the terminals, and a queue 24_1 of a first terminal 210_1 and a queue 24_4 of fourth terminal 210_4 are shown together.

Referring to FIG. 4A, the first terminal 210_1 is a floor arbitrator, and second to fourth terminals 210_2 to 210_4 are group call participants. The first terminal 210_1 may store a floor request received from the third terminal 210_3 and the fourth terminal 210_4. The first terminal 210_1 may store information regarding each of the third terminal 210_3 and the fourth terminal 210_4 requesting the floor from the queue 24_1, for example, an ID, an SSRC, and priority of each terminal. The information stored in the queue 24_1 may be referred to as queue information. The second to fourth terminals 210_2 to 210_4 may store current floor arbitrator information CAIF_2, CAIF_3, and CAIF_4, respectively. The current floor arbitrator information CAIF_2, CAIF_3, and CAIF_4 may include an SSRC of a current floor arbitrator. The SSRC of the first terminal 210_1 may be stored as the SSRC of the current floor arbitrator.

In operation S110, when a user's speaking using the first terminal 210_1 is finished, a PTT button may be released. In operation S110, the first terminal 210_1 may select the fourth terminal 210_4 having the highest priority based on the information stored in the queue 24_1, and transmit a floor grant message to the fourth terminal 210_4. The floor grant message may include the SSRC of a transmitter, i.e., the first terminal 210_1, the SSRC and ID of the fourth terminal 210_4, and the queue information. The floor grant message may be broadcasted to the second to fourth terminals 210_2 to 210_4 based on D2D communication.

The second terminal 210_2 and the third terminal 210_3 may manage the current floor arbitrator information CAIF_2 and CAIF_3 and the next floor arbitrator information NAIF_2 and NAIF_3. The current floor arbitrator information CAIF_2 and CAIF_3 and the next floor arbitrator information NAIF_2 and NAIF_3 may include the SSRC of the current floor arbitrator and an SSRC of the next floor arbitrator. In operation S130, when receiving the floor grant message, the second terminal 210_2 and the third terminal 210_3 may store an SSRC of a terminal to which the floor is to be transferred, i.e., the SSRC of the fourth terminal 210_4 as the SSRC of the next floor arbitrator. Accordingly, the second terminal 210_2 and the third terminal 210_3 may store the current floor arbitrator information CAIF_2 and CAIF_3 and the next floor arbitrator information NAIF_2 and NAIF_3. The fourth terminal 210_4 may be configured as the next floor arbitrator, that is, a floor arbitrator candidate when the first terminal 210_1 is configured as the current floor arbitrator.

In operation S140, the fourth terminal 210_4 may take the floor explicitly or implicitly. In other words, the fourth terminal 210_4 may accept the floor grant message. For example, the fourth terminal 210_4 may transmit a floor control message indicating that the floor is taken, or a media packet to the first to third terminals 210_1 to 210_3. The fourth terminal 210_4 may take the floor when a user accepts taking the floor or starts conversation. The fourth terminal 210_4 may store the queue information included in the floor grant message in the queue 24_4. The queue information may include information regarding the third terminal 210_3, for example, the SSRC, ID, or priority of the third terminal 210_3. The fourth terminal 210_4 may manage the queue information.

In operation S150, the fourth terminal 210_4 may transmit the media packet to the first to third terminals 210_1 to 210_3. In an example embodiment, the fourth terminal 210_4 may transmit the floor control message to the first to third terminals 210_1 to 210_3. When the fourth terminal 210_4 receives a floor request message from at least one of the first terminal 210_1 and the second terminal 210_2, the fourth terminal 210_4 may store information about the floor request from the first terminal 210_1 and the second terminal 210_2 in the queue 24_4. The fourth terminal 210_4 may manage the queue information as a floor arbitrator.

When the media packet is transmitted from the fourth terminal 210_4, the second terminal 210_2 and the third terminal 210_3 may confirm whether the media packet has been received from the next floor arbitrator, i.e., the fourth terminal 210_4. The second terminal 210_2 and the third terminal 210_3 may compare the SSRC of the transmitter included in the media packet with the stored SSRC of the next floor arbitrator. In operation S160, if the media packet has been received from the fourth terminal 210_4, the second terminal 210_2 and the third terminal 210_3 may update the SSRC of the current floor arbitrator based on the SSRC of the next floor arbitrator. The second terminal 210_2 and the third terminal 210_3 may store the stored SSRC of the next floor arbitrator, that is, the SSRC of the fourth terminal 210_4, as the SSRC of the current floor arbitrator. Accordingly, the fourth terminal 210_4 may be configured as the current floor arbitrator. In an example embodiment, the second terminal 210_2 and the third terminal 210_3 may delete the next floor arbitrator information NAIF_2 and NAIF_3.

In operation S170, when the first terminal 210_1 receives the media packet from a target terminal, i.e., the fourth terminal 210_4, the first terminal 210_1 may store the SSRC of the fourth terminal 210_4 as the SSRC of the current floor arbitrator. The first terminal 210_1 has determined an SSRC of the target terminal, that is, the SSRC of the fourth terminal, to be a transmitting entity of the floor grant message, and waits for the media packet to be received from the fourth terminal 210_4. When the media packet has been received from the fourth terminal 210_4, the first terminal 210_1 may store the SSRC of the fourth terminal 210_4 as the SSRC of the current floor arbitrator. The first terminal 210_1 may determine that a floor transfer has been completed.

In another example embodiment, after transmitting the floor grant message in operation S120, the first terminal 210_1 may store the SSRC of the fourth terminal 210_4, which is the target terminal, as the SSRC of the current floor arbitrator, that is, the current floor arbitrator information. Thereafter, when the media packet has been received, the first terminal 210_1 may determine that the floor transfer has been completed if an SSRC of a transmitter of the received media packet is the same as the SSRC of the current floor transfer.

Referring to FIG. 4B, when the PTT button is released in operation S210, in operation S220, the first terminal 210_1 may select the fourth terminal 210_4 having the highest priority based on the queue information stored in the queue 24_1, and transmit a floor grant message to the second to fourth terminal 210_2 to 210_4.

In operation S230, when receiving the floor grant message, the second terminal 210_2 and the third terminal 210_3 may store an SSRC of a target of the floor grant included in the floor grant message, i.e., the SSRC of the fourth terminal 210_4, as the SSRC of the next floor arbitrator. Since operations S210 to S230 are similar to operations S110 to S130 of FIG. 4A, repeated descriptions thereof will not be given herein.

In operation S240, the fourth terminal 210_4 may reject the floor. The fourth terminal 210_4 may not accept the floor grant message by not responding to the floor grant message if a user rejects taking the floor or does not respond to the fourth terminal 210_4 for a predetermined time.

In operation S240, if the fourth terminal 210_4 rejects the floor, the first terminal 210_1 may transmit another floor grant message. In operation S250, the first terminal 210_1 may select the third terminal 210_3 having a higher priority next to the fourth terminal 210_4 based on the queue information stored in the queue 24_1, and transmit the other floor grant message for the third terminal 210_3. The other floor grant message for the third terminal 210_3 may be broadcasted to the second to fourth terminals 210_2 to 210_4.

In operation S260, the fourth terminal 210_4 may store an SSRC of the third terminal 210_3 as the SSRC of the next floor arbitrator. In operation S265, the second terminal 210_2 may update the SSRC of the next floor arbitrator based on the SSRC of the third terminal 210_3. The second terminal 210_2 has already stored the SSRC of the next floor arbitrator. Accordingly, the second terminal 210_2 may update the SSRC of the next floor arbitrator based on the SSRC of the third terminal 210_3 by storing the SSRC of the third terminal 210_3 as the SSRC of the next floor arbitrator.

The third terminal 210_3 may take or reject the floor. In operation S270, the third terminal 210_3 takes the floor, i.e., accepts the floor grant message, and may store the queue information included in the other floor grant message in the queue 24_3. In operation S280, the third terminal 210_3 may transmit a media packet to the other terminals, i.e., the first terminal 210_1, the second terminal 210_2 and the fourth terminal 210_4. Alternatively, the third terminal 210_3 may transmit a floor control message to the other terminals.

When the media packet has been received, the second terminal 210_2 and the fourth terminal 210_4 may confirm whether or not the media packet has been received from the next floor arbitrator, i.e., the third terminal 210_3. In operation S290, if the media packet has been received from the third terminal 210_3, the second terminal 210_2 and the fourth terminal 210_4 may update the SSRC of the current floor arbitrator based on the SSRC of the next floor arbitrator. The second terminal 210_2 and the fourth terminal 210_4 may store the stored SSRC of the next floor arbitrator, that is, the SSRC of the third terminal 210_3, as the SSRC of the current floor arbitrator. Accordingly, the third terminal 210_3 may be configured as the current floor arbitrator. In an example embodiment, the second terminal 210_2 and the fourth terminal 210_4 may delete the next floor arbitrator information NAIF_2 and NAIF_4.

In operation S295, when receiving the media packet from a target terminal of the last transmitted floor grant message, the first terminal 210_1 may store the SSRC of the third terminal 210_3 as the SSRC of the current floor arbitrator. The first terminal 210_1 may determine that a floor transfer has been completed.

In another example embodiment, after transmitting the floor grant message in operations S120 and S250, the first terminal 210_1 may store the SSRC of the target terminal as the SSRC of the current floor arbitrator. For example, in operation S220, the first terminal 210_1 may broadcast the floor grant message for the fourth terminal 210_4, and may store the SSRC of the fourth terminal 201_4 as the SSRC of the current floor arbitrator. At this time, the second and third terminals 201_2 and 201_3 might not store the SSRC of the fourth terminal 201_4 as the SSRC of the current floor arbitrator. After the fourth terminal 210_4 rejects the floor, the first terminal 210_1 may transmit the floor grant message for the third terminal 210_3, and then store the SSRC of the third terminal 210_3 as the SSRC of the current floor arbitrator. Thereafter, when the media packet has been received, the first terminal 210_1 may determine that the floor transfer has been completed if the SSRC of the transmitter of the received media packet is the same as the SSRC of the third terminal 210_3, which is the SSRC of the current floor arbitrator.

Unlike the method of transferring the floor according to example embodiments of the inventive concept described with reference to FIGS. 4A and 4B, the second and third terminals 210_2 and 210_3 may manage only the current floor arbitrator information, and may update a target terminal included in the floor grant message, for example, the SSRC of the fourth terminal 210_4, as the SSRC of the current floor arbitrator when receiving the floor grant message from the first terminal 210_1 that is the floor arbitrator. Accordingly, the second and third terminals 210_2 and 210_3 may recognize the fourth terminal 210_4 as a floor arbitrator. However, when the fourth terminal 210_4 rejects the floor, the floor cannot be transferred, so that the first terminal 210_2 as a floor arbitrator may change the target terminal, and broadcast the floor grant message for a changed target terminal. However, the second terminal 210_2 and the third terminal 210_3 may ignore the floor control message received from the first terminal 210_1 because the fourth terminal 210_4 is mistakenly recognized as the floor arbitrator. Thereby, an inefficient additional operation may be caused or the floor transfer may not be performed normally.

However, as described above, according to the method of transferring the floor according to the example embodiments of the inventive concept, since terminals update floor arbitrator information after the floor is actually transferred, the floor may be normally transferred even if the target terminal of the floor grant message rejects the floor.

Figure 5:
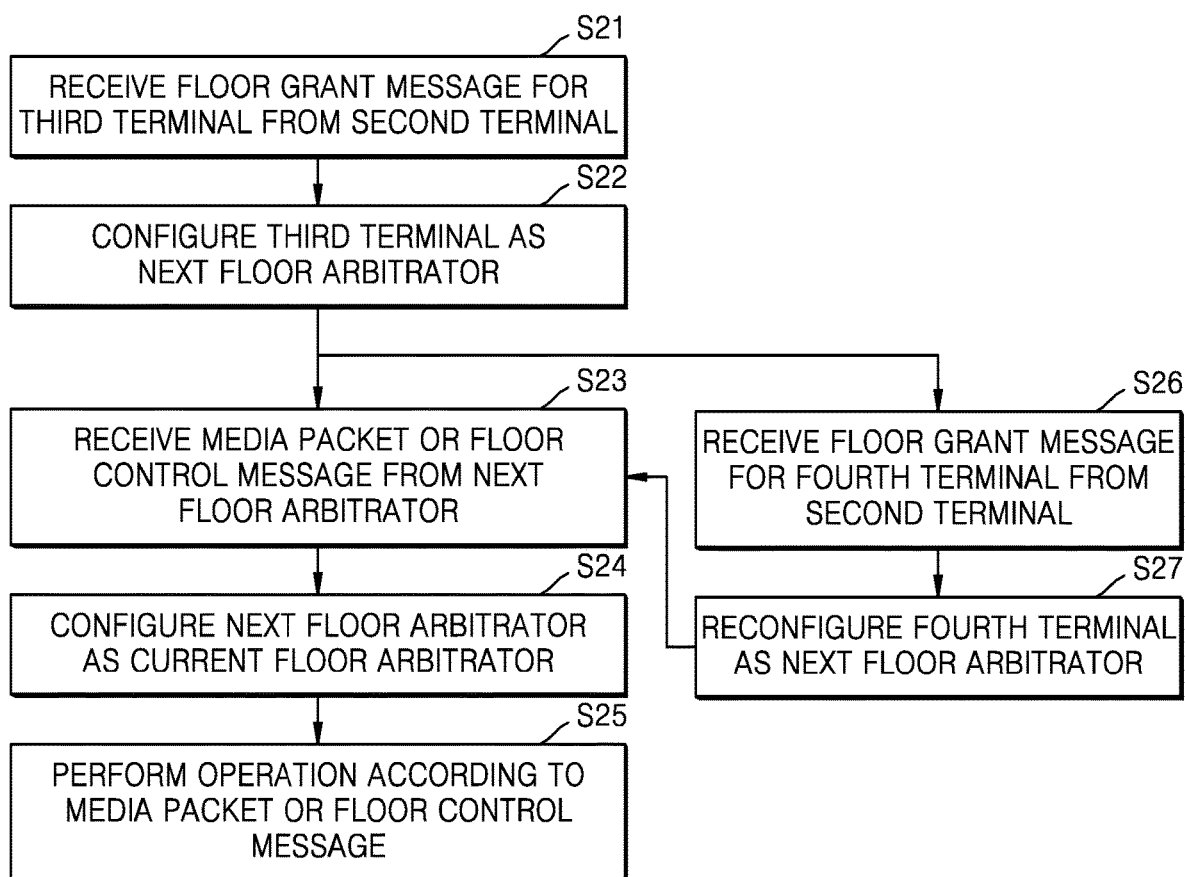
FIG. 5 is a flowchart of a method of operating a first terminal, according to an example embodiment of the inventive concept.

FIG. 5 is a flowchart of a method of operating a first terminal, according to an example embodiment of the inventive concept. In more detail, the first terminal is a group call participant and may be in one of a 'start-stop' state, an 'O: silence' state, an 'O: pending request' state, an 'O: queued' state, and an 'O: has no permission' state.

Referring to FIG. 5, in operation S21, the first terminal may receive a floor grant message for a third terminal from a second terminal. The second terminal may be a floor arbitrator, and the third terminal may be a terminal having the highest priority in taking the floor among terminals requesting the floor.

In operation S22, the first terminal may configure the third terminal as the next floor arbitrator. In other words, the first terminal may regard a target terminal of the floor grant message as a floor arbitrator candidate. The first terminal may store an SSRC of the third terminal included in the floor grant message as an SSRC of the next floor arbitrator.

In operation S23, the first terminal may receive a media packet or a floor control message from the next floor arbitrator. In other words, the first terminal may receive a media packet or a floor control message from the third terminal. The first terminal may confirm that the media packet or the floor control message has been received from the next floor arbitrator, that is, the third terminal by comparing an SSRC of a transmitter of the media packet or the floor control message with the stored SSRC of the next floor arbitrator.

In operation S24, the first terminal may configure the next floor arbitrator as the current floor arbitrator. In other words, the first terminal may change the floor arbitrator from the second terminal to the third terminal. The first terminal may change the floor arbitrator by storing the SSRC of the next floor arbitrator as an SSRC of the current floor arbitrator.

Since the first terminal recognizes the third terminal as a floor arbitrator, it can be determined that the media packet or the floor control message received from the third terminal is valid. Accordingly, in operation S25, the first terminal may perform an operation according to the media packet or the floor control message. For example, the first terminal may render a received media packet or enter a state according to the floor control message received from the third terminal.

For example, if the floor control message is the floor grant message, the first terminal may store an SSRC of a terminal, to which the floor is to be transferred, which is included in the floor grant message as the SSRC of the next floor arbitrator.

Meanwhile, in operation S26, the first terminal may receive a floor grant message for a fourth terminal from the second terminal after operation S22. Since the first terminal recognizes the second terminal as a floor arbitrator, it can be determined that a media packet or a floor control message received from the second terminal is valid. Therefore, in operation S27, the first terminal may reconfigure the fourth terminal as the next floor arbitrator. Thereafter, the first terminal may operate according to operations S23 to S25.

Figure 6:
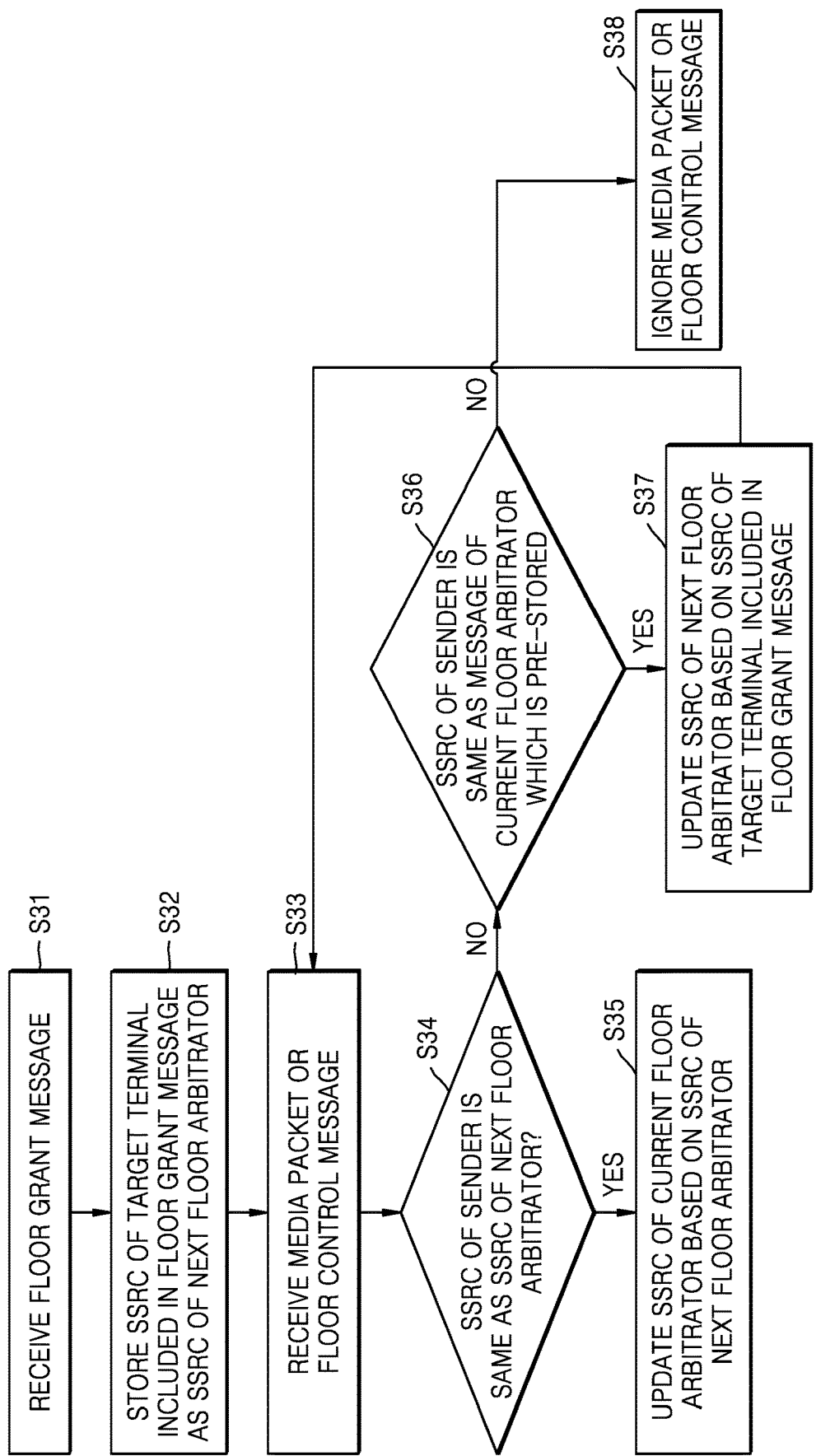
FIG. 6 is a flowchart of a method of operating a terminal, according to an example embodiment of the inventive concept.

FIG. 6 is a flowchart of a method of operating a terminal, according to an example embodiment of the inventive concept.

Referring to FIG. 6, in operation S31, a terminal may receive a floor grant message, and in operation S32, the terminal may store an SSRC of a target terminal included in the floor grant message as an SSRC of a next floor arbitrator. The floor grant message may include an SSRC of a transmitter, the SSRC of the target terminal, and an SSRC of a terminal requesting the floor, i.e., an SSRC included in queue information. The terminal may store the SSRC of the target terminal as the SSRC of the next floor arbitrator. The SSRC of the target terminal may be included in a "granted floor-participant field" in the floor grant message and received.

In operation S33, the terminal may receive a media packet or a floor control message, and in operation S34, the terminal may determine whether an SSRC of a transmitter of the media packet or the floor control message is the same as the SSRC of the next floor arbitrator stored in operation S32.

In operation S35, if the SSRC of the transmitter of the media packet or the floor control message is the same as the SSRC of the next floor arbitrator, the terminal may update an SSRC of a current floor arbitrator based on the SSRC of the next floor arbitrator.

However, in operation S36, if the SSRC of the transmitter of the media packet or the floor control message is not the same as the SSRC of the next floor arbitrator, it can be determined whether the SSRC of the transmitter of the media packet or the floor control message is the same as a message of the current floor arbitrator which is pre-stored. In other words, if the SSRC of the transmitter of the media packet or the floor control message is not the same as the SSRC of the next floor arbitrator, it can be determined that a floor transfer is not completed, and it can be determined whether the media packet or the floor control message is valid. The terminal may determine that only the media packet or the floor control message received from the current floor arbitrator or the next floor arbitrator is valid. In an example embodiment, in operation S37, if a floor control message includes a floor grant message, the terminal may update the SSRC of the next floor arbitrator based on the SSRC of the target terminal included in this floor grant message.

In operation S38, if the SSRC of the transmitter of the media packet or the floor control message is not the same as the SSRC of the current floor arbitrator which is pre-stored, the terminal may determine that the received media packet or floor control message is invalid and ignore the received media packet or floor control message.

Figure 7:
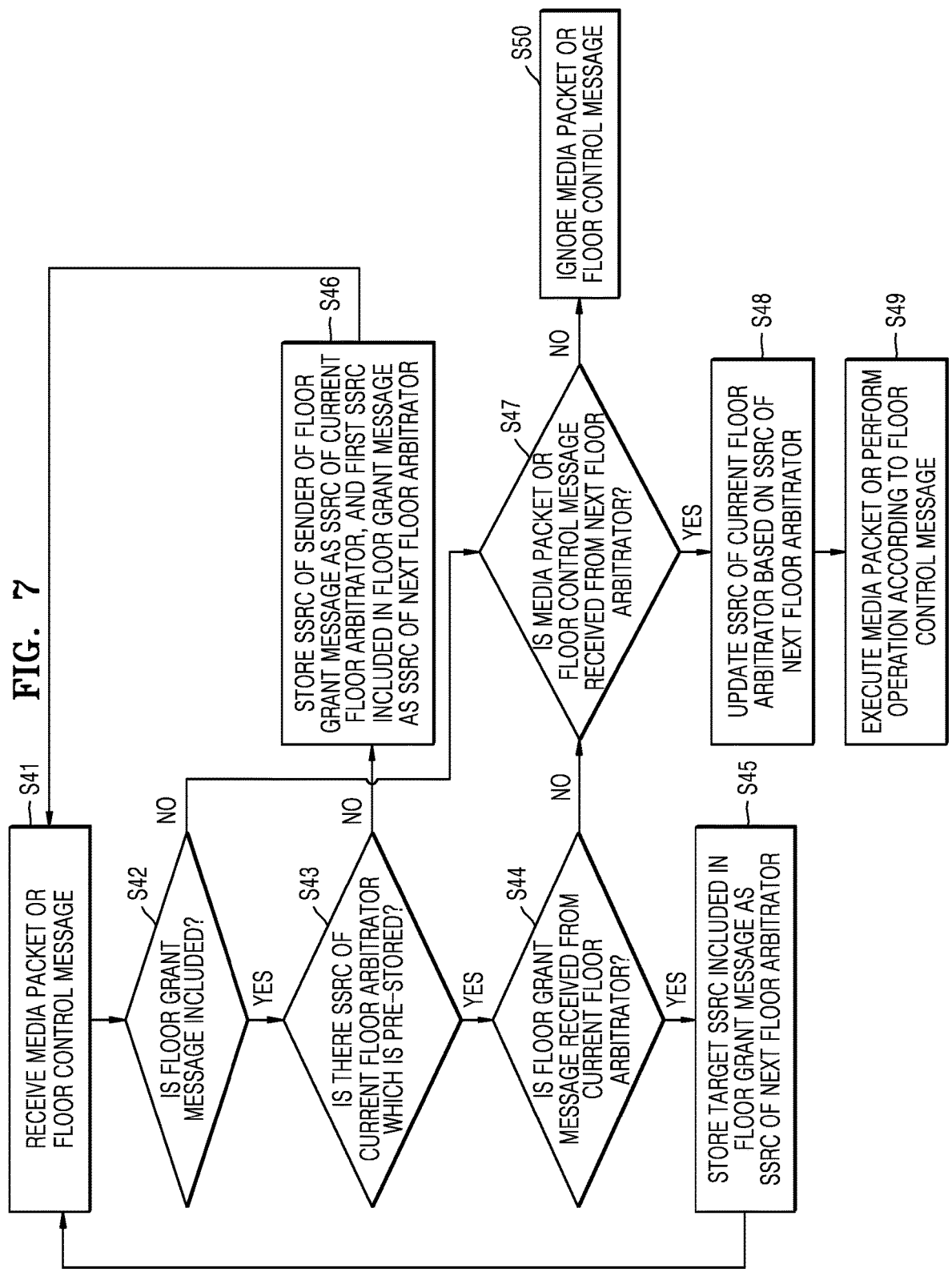
FIG. 7 is a flowchart of a method of operating a terminal, according to an example embodiment of the inventive concept.

FIG. 7 is a flowchart of a method of operating a terminal, according to an example embodiment of the inventive concept.

FIG. 7 shows a process in which a terminal determines an SSRC of a floor arbitrator according to a media packet or a floor control message that are received.

Referring to FIG. 7, in operation S41, the terminal is a terminal having no floor, and may receive the media packet or the floor control message. In operation S42, the terminal may determine whether a floor grant message is included in the media packet or the floor control message. In operation S43, if the floor grant message is received, the terminal may confirm whether there is an SSRC of a current floor arbitrator which is pre-stored. In other words, the terminal may determine whether there is an SSRC of the current floor arbitrator which is pre-stored before the floor grant message is received.

If there is no SSRC of the current floor arbitrator which is pre-stored, there is no other terminal that is recognized as the current floor arbitrator by the terminal. Accordingly, the terminal may recognize a transmitter of the floor grant message as a floor arbitrator, and determine that the floor grant message is valid. In operation S46, the terminal may store an SSRC of the transmitter of the floor grant message as the SSRC of the current floor arbitrator and a first SSRC included in the floor grant message as an SSRC of a next floor arbitrator.

If there is an SSRC of the current floor arbitrator which is pre-stored, the terminal may determine validity of the floor grant message by comparing the SSRC of the transmitter of the floor grant message with the SSRC of the current floor arbitrator, in operation S44.

If the floor grant message is received from the current floor arbitrator, the floor grant message is valid. Accordingly, in operation S45, the terminal may store a target SSRC included in the floor grant message as the SSRC of the next floor arbitrator.

Meanwhile, in operation S47, if the floor grant message is not received or received but not from the current floor arbitrator, the terminal may confirm whether the media packet or the floor control message is received from the next floor arbitrator.

In operation S48, if the floor control message is received from the next floor arbitrator, the terminal may update the SSRC of the current floor arbitrator based on the SSRC of the next floor arbitrator to change the floor arbitrator to a transmitter of the media packet or the floor control message. Thereafter, in operation S49, the terminal may execute the received media packet or perform an operation according to the floor control message.

However, in operation S50, if the media packet or the floor control message is not received from the next floor arbitrator, the terminal may determine that the media packet or the floor control message is invalid, and may ignore the media packet or the floor control message.

Figure 8:
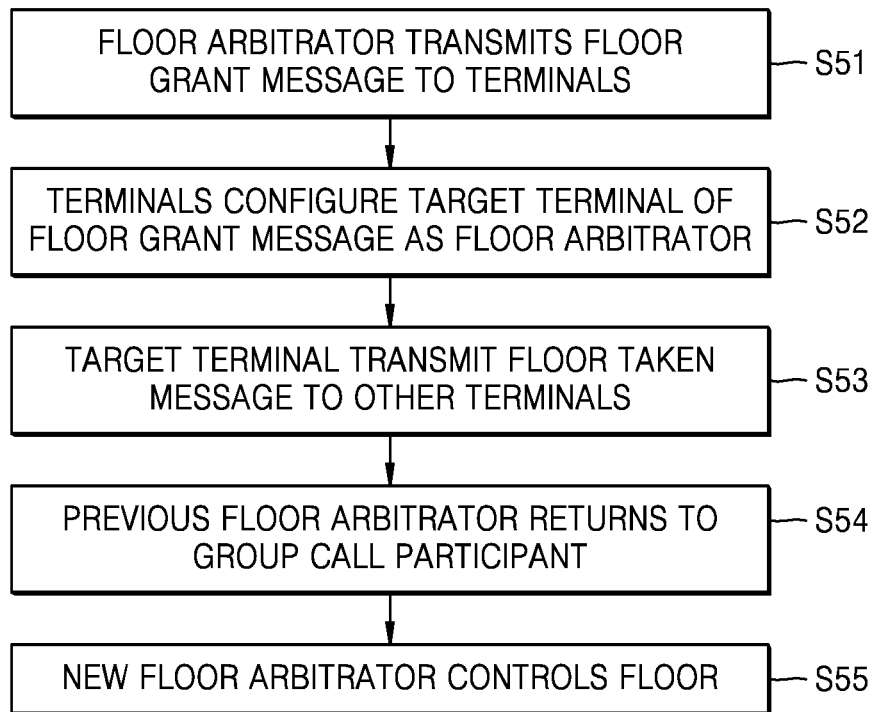
FIG. 8 is a flowchart of a method of operating terminals participating in an MCPTT group call in an off-network, according to an example embodiment of the inventive concept.

FIG. 8 is a flowchart of a method of operating terminals participating in an MCPTT group call in an off-network, according to an example embodiment of the inventive concept.

Referring to FIG. 8, in operation S51, when a user's speaking using a terminal is finished, for example, when a PTT button of the terminal is released, the terminal, as a floor arbitrator, may transmit a floor grant message to other terminals.

In operation S52, the other terminals may configure a target terminal indicated in the floor grant message as a current floor arbitrator. The terminals may update an SSRC of the current floor arbitrator based on an SSRC of the target terminal by storing the SSRC of the target terminal as the SSRC of the current floor arbitrator. The terminals may recognize the target terminal as the floor arbitrator.

In operation S53, the target terminal may receive the floor grant message and transmit a floor taken message to other terminals regardless of whether or not a user answers with a PTT button pressed. Thereby, a floor transfer may be completed. In operation S54, the terminal, now a previous floor arbitrator, may store the SSRC of the target terminal as the SSRC of the current floor arbitrator, and return as a group call participant.

In operation S55, a new floor arbitrator, that is, the target terminal of the floor grant message may control a floor of a group call as the floor arbitrator.

Figure 9A:
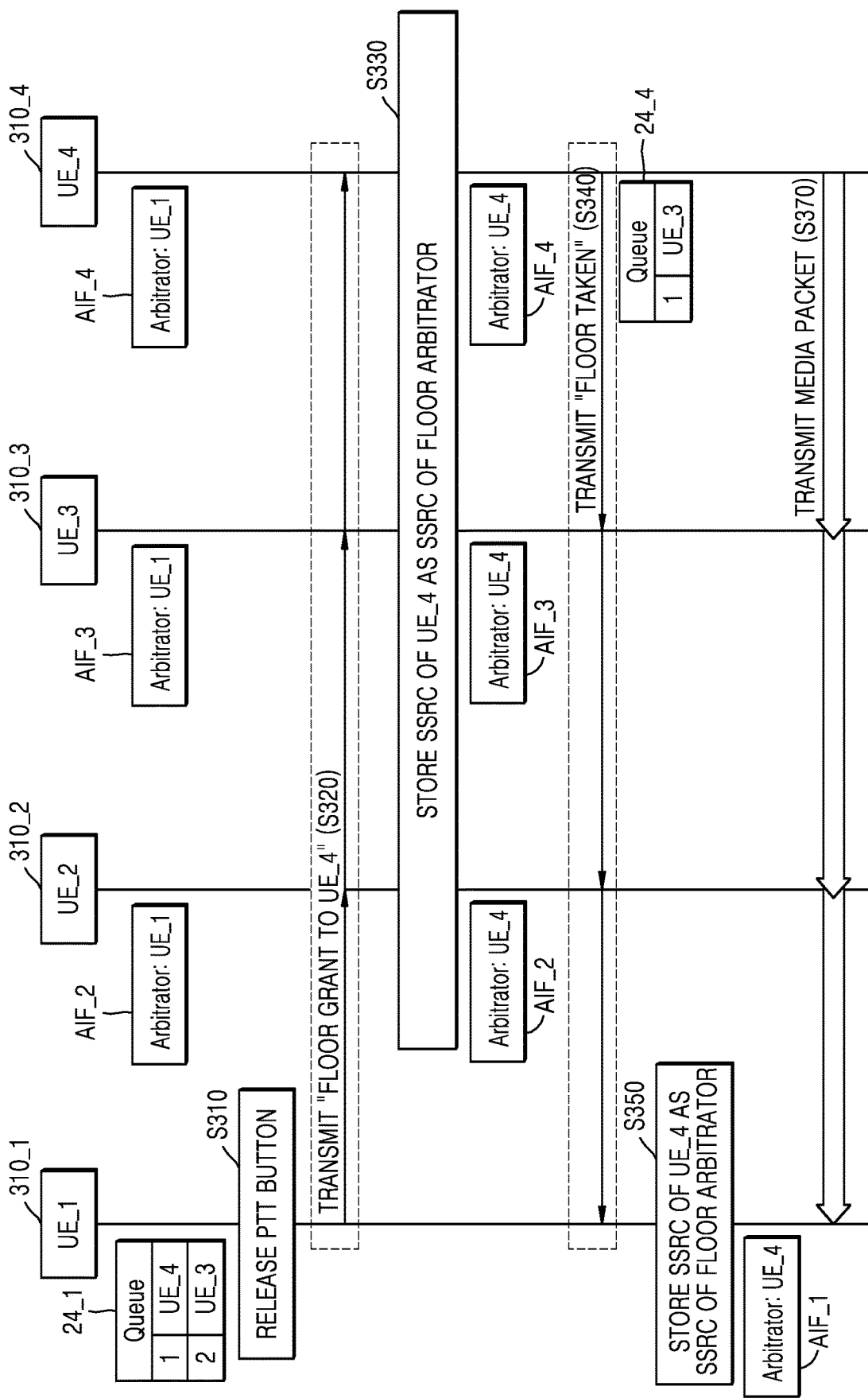
FIGS. 9A and 9B are flowcharts of a method of operating terminals participating in an MCPTT group call in an off-network, according to example embodiments of the inventive concept.
Figure 9B:
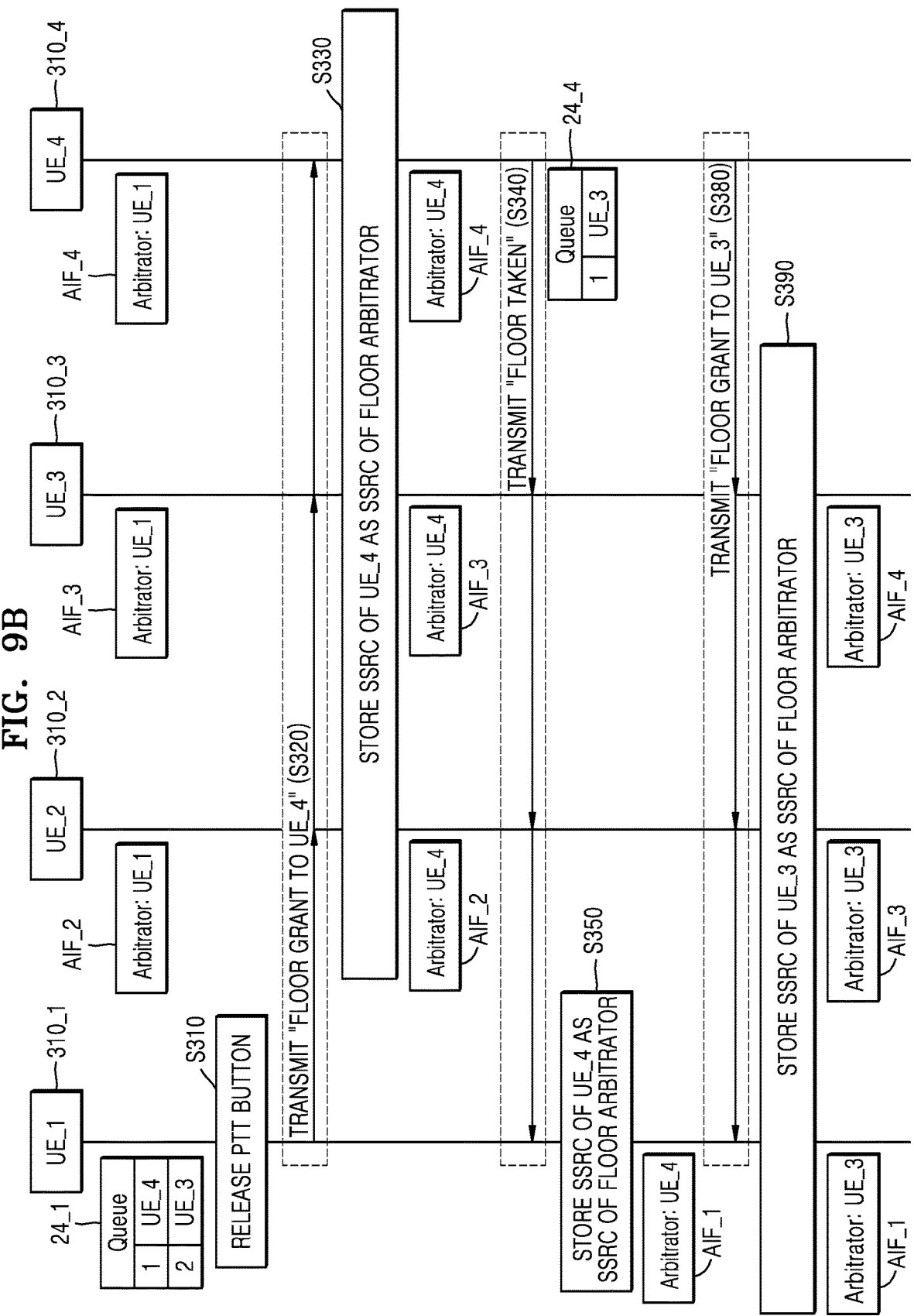

FIGS. 9A and 9B are flowcharts of a method of operating terminals participating in an MCPTT group call in an off-network, according to an example embodiment of the inventive concept. In more detail, FIGS. 9A and 9B show processes of transferring the floor. For convenience of explanation, floor arbitrator information AIF_1, AIF_2, AIF_3, and AIF_4 stored in each of the terminals, and a queue 24_1 of a first terminal 310_1 and a queue 24_4 of a fourth terminal 310_4 are shown together.

Referring to FIGS. 9A and 9B, the first terminal 310_1 is a floor arbitrator, and second to fourth terminals 310_2 to 310_4 are floor participants (or group call participants). The second to fourth terminals 310_2 to 310_4 may store the floor arbitrator information AIF_2, AIF_3, and AIF_4, respectively. The floor arbitrator information AIF_2, AIF_3, and AIF_4 may include an SSRC of the floor arbitrator. The second to fourth terminals 310_2 to 310_4 may store an SSRC of the first terminal 310_1 as the SSRC of the floor arbitrator. Accordingly, the second to fourth terminals 310_2 to 310_4 may recognize the first terminal 310_1 as the floor arbitrator.

The first terminal 310_1 may receive a floor request from the fourth terminal 310_4 and the third terminal 310_3, and may store the received floor request in the queue 24_1.

In operation S310, when the user's speaking using the first terminal 210_1 is finished, a PTT button of the first terminal 210_1 may be released. In operation S320, the first terminal 210_1 may select the fourth terminal 210_4 having the highest priority based on the information stored in the queue 24_1, and broadcast a floor grant message for the fourth terminal 210_4. Since operations S310 and S320 are substantially the same as operations S110 and S120 described with reference to FIG. 4A, repeated descriptions thereof will not be given herein.

In operation S330, the second to fourth terminals 310_2 to 310_4 may store an SSRC of a target terminal included in the floor grant message, i.e., an SSRC of the fourth terminal 310_4 as the SSRC of a floor arbitrator.

In operation S340, the fourth terminal 310_4, which is a target terminal of the floor grant message, may transmit a floor taken message. The floor taken message may be broadcasted to the first to third terminals 310_1 to 310_3. Even if a user does not accept the floor taken message, a floor transfer may be completed when the target terminal transmits the floor taken message. The fourth terminal 310_4 may operate as the floor arbitrator with a floor. The fourth terminal 310_4 may manage queue information. When receiving the floor taken message from the fourth terminal 310_4, the first terminal 310_1 may confirm that the fourth terminal 310_4 has become the floor arbitrator, delete content of the queue 24_1, and return as a floor participant. In operation S350, the first terminal 310_1 may store the SSRC of the fourth terminal 310_4 as the SSRC of the floor arbitrator.

In operation S370, if a user of the fourth terminal 310_4 takes the floor in the processes of transferring the floor, as shown in FIG. 9A, the fourth terminal 310_4, which is the floor arbitrator, may transmit a media packet including voice, sound, etc. of the user to the first to third terminals 310_1 to 310_3.

Meanwhile, if the user of the fourth terminal 310_4 does not accept the floor taken message or does not respond to the fourth terminal 310_4 for a predetermined time, the fourth terminal 310_4 may act as the floor arbitrator, as shown in FIG. 9B. In operation S380, the fourth terminal 310_4 may select the third terminal 310_3 having the highest priority in the queue 24_4 as a terminal to which the floor is to be transferred, and may transmit a floor grant message to the third terminal 310_3. In operation S390, each of the first to third terminals 310_1 to 310_3 may receive the floor grant message, and may recognize that the floor arbitrator has been changed to the third terminal 310_3. Each of the first to third terminals 310_1 to 310_3 may update the SSRC of the floor arbitrator based on an SSRC of the third terminal 310_3.

Figure 10:
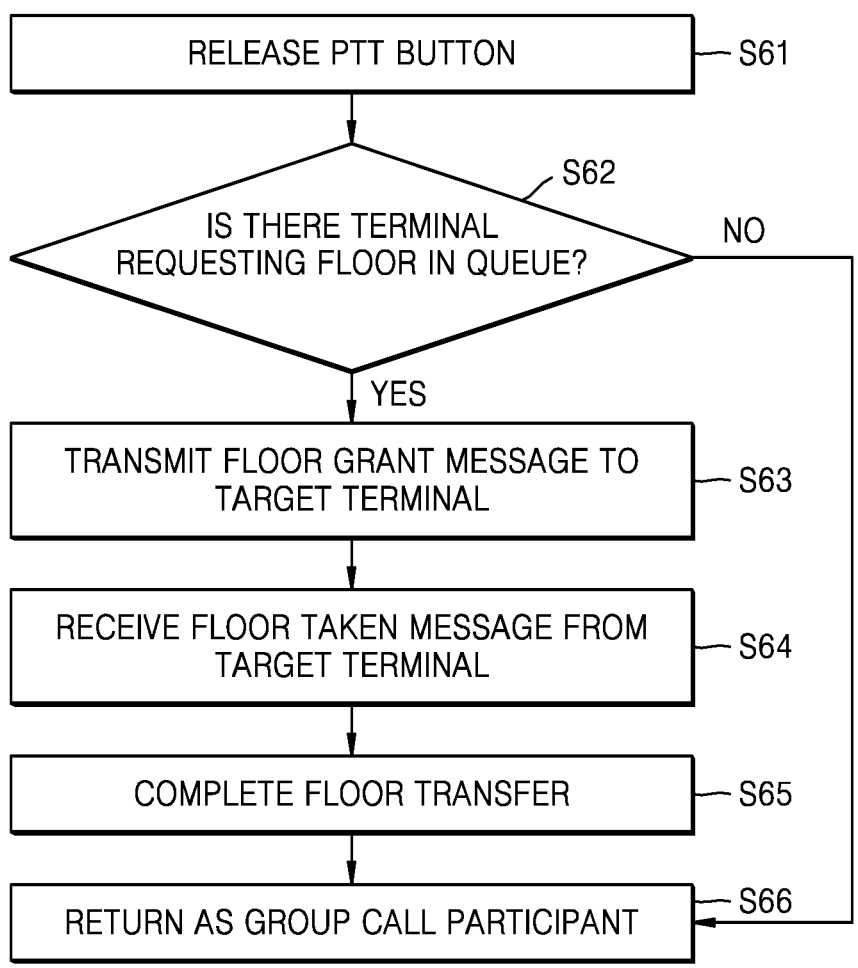
FIG. 10 is a flowchart of an operation of a terminal acting as a floor arbitrator in a method of transferring the floor, according to an example embodiment of the inventive concept.

FIG. 10 is a flowchart of an operation of a terminal acting as a floor arbitrator in a method of transferring a floor, according to an example embodiment of the inventive concept.

Referring to FIG. 10, a user may complete a speech by releasing a PTT button of a terminal. When the PTT button is released in operation S61, in operation S62, the terminal acting as a floor arbitrator may confirm whether there is a terminal requesting the floor by determining whether there is a floor request stored in a queue. In operation S63, if there is a floor request in a queue, a terminal having the highest priority may be selected as a target terminal, and a floor grant message may be broadcasted for the target terminal.

In operation S64, when a floor taken message has been received from the target terminal, then in operation S65, the terminal may confirm that a floor transfer is completed. In operation S66, the terminal may delete queue information stored in the queue, and return as a group call participant. Thereby, the floor transfer process may be completed.

On the other hand, if there is no request for the floor in operation S62, in operation S66, the terminal may return from the floor arbitrator to the group call participant, and the floor transfer process may be completed.

Figure 11:
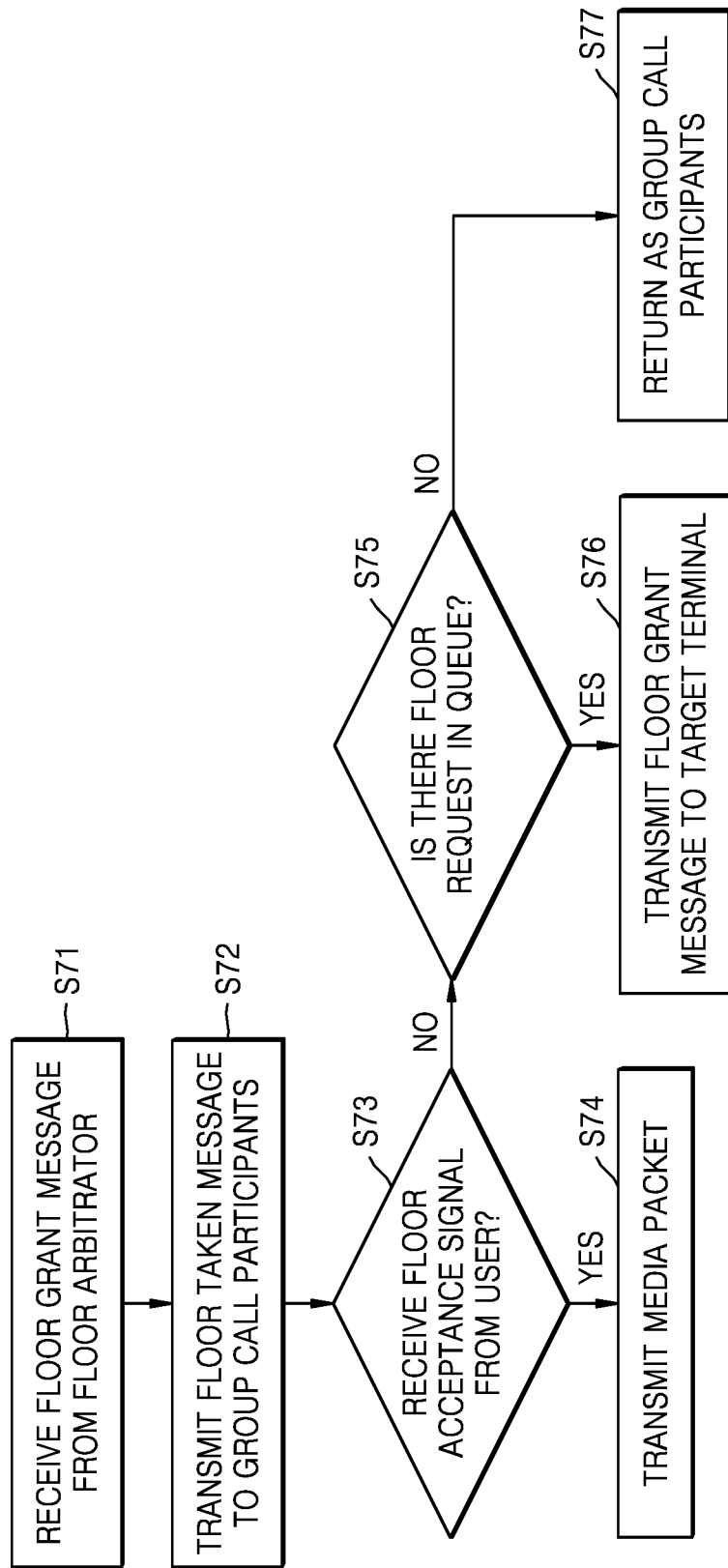
FIG. 11 is a flowchart of an operation of a terminal, to which the floor is to be transferred, in a method of transferring the floor, according to an example embodiment of the inventive concept.

FIG. 11 is a flowchart of an operation of a terminal, to which a floor is to be transferred, in a method of transferring the floor, according to an example embodiment of the inventive concept.

Referring to FIG. 11, in operation S71, a terminal to which the floor is to be transferred (hereinafter, referred to as a target terminal) may receive a floor grant message from a floor arbitrator. In operation S72, the target terminal may transmit a floor taken message to group call participants. Thereby, the target terminal becomes a new floor arbitrator and the floor transfer process is completed. When receiving a floor acceptance signal from a user in operation S73, in operation S74, the new floor arbitrator may transmit a media packet to the group call participants. If a user does not respond to the floor arbitrator for a predetermined time limit or the user does not take the floor, in operation S75, the floor arbitrator may check whether there is a floor request in a queue, and in operation S76, the floor arbitrator may transmit a floor grant message to a terminal having the highest priority among terminals requesting the floor. In operation S77, if there is no floor request in the queue, the floor arbitrator may return as a group call participant.

According to methods of operating terminals participating in an MCPTT group call in an off-network according to the present example embodiments, when a terminal to which a floor is to be transferred, which is a target terminal, may be a floor arbitrator regardless of whether or not a user accepts, and the other terminals of the MCPTT group call may also recognize the target terminal as the floor arbitrator.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 1 and 2 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. At least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While the inventive concept has been particularly shown and described with reference to example embodiments thereof, it will be understood that various changes in form and details may be made therein without departing from the spirit and scope of the following claims.

What is claimed is:

1. A method of operating a Mission Critical Push To Talk (MCPTT) group comprising a plurality of terminals participating in an MCPTT group call in an off-network, the method comprising:
   receiving, by a first terminal among the plurality of terminals, a first floor grant message from a second terminal having a floor, the first floor grant message indicates a floor transfer to the first terminal;
   transmitting, by the first terminal, a floor taken message to the plurality of terminals, except the first terminal; and
   controlling, by the first terminal, the floor,
   wherein the controlling the floor comprises transmitting a second floor grant message to the plurality of terminals except the first terminal based on taking the floor not being accepted by the user of the first terminal for a predetermined time, the second floor grant message indicates a floor transfer to one of terminals with floor request information stored in a floor request queue of the first terminal.

2. The method of claim 1, wherein the controlling the floor comprises transmitting media data by the first terminal if taking the floor is accepted by the user of the first terminal within the predetermined time.

3. The method of claim 1, wherein the first terminal transmits the floor taken message regardless of whether a user of the first terminal accepts taking the floor.

4. The method of claim 1, wherein the first floor grant message includes an Synchronization Source (SSRC) of the first terminal and the floor request information.

5. The method of claim 1, the one of terminals has a highest priority among the terminals.

6. The method of claim 1, wherein the second terminal having the floor is a floor arbitrator.

7. The method of claim 1, wherein the second terminal is configured to enter a has-no-permission state when the floor taken message has been received from the first terminal.

8. The method of claim 7, wherein the second terminal is configured to delete the floor request information stored in a floor request queue of the second terminal.

9. The method of claim 1, further comprising:
   receiving, by a third terminal, the first floor grant message from the second terminal; and
   updating, by the third terminal, a Synchronization Source (SSRC) of a current floor arbitrator from the SSRC of the second terminal to a SSRC of the first terminal included in the first floor grant message.

10. The method of claim 9, wherein
    receiving, by the third terminal, the floor taken message from the first terminal after updating the SSRC of the current floor arbitrator.

11. A method of operating a Mission Critical Push To Talk (MCPTT) group comprising a plurality of terminals participating in an MCPTT group call in an off-network, the method comprising:
    receiving, by a third terminal among the plurality of terminals, a first floor grant message from a second terminal which is a floor arbitrator, the first floor grant message indicates a floor transfer to a first terminal;
    updating, by the third terminal, an Synchronization Source (SSRC) of the floor arbitrator from an SSRC of the second terminal to an SSRC of the first terminal;
    receiving, by the third terminal, a floor taken message from the first terminal;
    receiving, by the third terminal, media data or a second floor grant message,
    the second floor grant message indicating the floor transfer to a fourth terminal is received by the third terminal based on taking the floor not being accepted by a user of the first terminal for a predetermined time.

12. The method of claim 11, further comprising:
    updating, by the third terminal, the SSRC of the floor arbitrator from the SSRC of the first terminal to an SSRC of a forth terminal in response to receiving the second floor grant message from the first terminal, the second floor grant message indicates the floor transfer to the fourth terminal.

13. The method of claim 11, further comprising:
ignoring, by the third terminal, the media data or the second floor grant message if the SSRC of the transmitter of the media data or the second floor grant message is different from the SSRC of the floor arbitrator.

14. The method of claim 11, wherein:
the media data is received by the third terminal based on taking the floor being accepted by the user of the first terminal within the predetermined time.

15. A method of operating a Mission Critical Push To Talk (MCPTT) group comprising a plurality of terminals participating in an MCPTT group call in an off-network, the method comprising:
selecting, by a second terminal among the plurality of terminals, a first terminal having a highest priority among at least one terminal requesting the floor as a target terminal to which the floor to be transferred based on queue information stored in a queue;
broadcasting, by the second terminal, a first floor grant message indicating the floor transfer to the first terminal to the plurality of terminals except the second terminal;
receiving, by the second terminal, a floor taken message from the first terminal;
deleting, by the second terminal, the queue information stored in the queue; and
receiving, by the second terminal, a second floor grant message indicating the floor transfer to a third terminal from the first terminal, the second floor grant message being received by the second terminal based on taking the floor not being accepted by a user of the first terminal for a predetermined time.

16. The method of claim 15, wherein the second terminal is configured to return as a group call participant from a floor arbitrator by deleting the queue information.

17. The method of claim 15, further comprising:
storing, by the second terminal, an Synchronization Source (SSRC) of the first terminal as an SSRC of a floor arbitrator.

18. The method of claim 15, further comprising:
receiving, by the second terminal, media data, the media data being received by the second terminal based on the taking the floor being accepted by the user of the first terminal within the predetermined time.

19. The method of claim 18, further comprising:
updating, by the second terminal, the SSRC of the floor arbitrator as a SSRC of the third terminal included in the second floor grant message, in response to receiving the second floor grant message.

* * * * *